United States Patent
Bennett

(10) Patent No.: US 9,405,133 B2
(45) Date of Patent: Aug. 2, 2016

(54) BRANDABLE SHUTTER EYEWEAR APPARATUS

(71) Applicant: Jethro Bennett, Cambridge (GB)

(72) Inventor: Jethro Bennett, Cambridge (GB)

( * ) Notice: Subject to any disclaimer, the term of this patent is extended or adjusted under 35 U.S.C. 154(b) by 38 days.

(21) Appl. No.: 14/101,757

(22) Filed: Dec. 10, 2013

(65) Prior Publication Data

US 2014/0168597 A1    Jun. 19, 2014

(30) Foreign Application Priority Data

Dec. 15, 2012  (GB) .................................. 1222664.3
Aug. 15, 2013  (GB) .................................. 1314647.7

(51) Int. Cl.
*G02C 11/02*    (2006.01)
*G02C 7/10*     (2006.01)
*G02C 7/16*     (2006.01)
*G09F 23/00*    (2006.01)

(52) U.S. Cl.
CPC ...... *G02C 11/02* (2013.01); *G02C 7/10* (2013.01); *G02C 7/16* (2013.01); *G09F 23/00* (2013.01)

(58) Field of Classification Search
CPC ............ G02C 11/02; G02C 5/008; G02C 7/10
USPC .............................. 351/44–46, 51, 158; 2/242
See application file for complete search history.

(56) References Cited

U.S. PATENT DOCUMENTS

| | | | |
|---|---|---|---|
| 2,114,658 A * | 4/1938 | Noffsinger | 2/12 |
| D590,868 S * | 4/2009 | Wilkerson | D16/301 |
| 2006/0132704 A1* | 6/2006 | Gait | A42B 3/20 351/62 |
| 2009/0000167 A1* | 1/2009 | Leonhardt | 40/586 |

* cited by examiner

*Primary Examiner* — Darryl J Collins
*Assistant Examiner* — Journey Sumlar

(57) ABSTRACT

A shutter eyewear apparatus 10, comprises an orbital frame 12, the orbital frame 12 itself comprising a left orbital aspect 12L and a right orbital aspect 12R, multiple strut members 14 within the orbital aspects, a left wing and right wing, the wings 16 having a width of at least 12 mm at any point along a length of the wings 16, a word element 48 lengthwise along at least one wing, and a franchise logo element. Preferably the wings are approximately 23 mm wide at a folding break 34 of the wings, and preferably the franchise logo element is provided about a neck 28 of at least one wing.

20 Claims, 8 Drawing Sheets

BRANDABLE SHUTTER EYEWEAR APPARATUS

The present invention relates to brandable eyewear.

BACKGROUND

A pair of fully brandable merchandising eyewear has not hitherto been created.

Many teams and iconic brands have sold billions of dollars worldwide of branded shirts, socks, hats, etc, and even more decorative items, but no fully brandable eyewear has been created and effectively (from a commercial sense) been sold.

Regular glasses do not have the real-estate required for full branding. The orbital frame (the part of the frame that surrounds the eye) tends to be fairly thin in many designs—what is more, glasses tend to have a lens within the orbital frame that covers the eye, and these tend to be tinted for fashion glasses, which is not suitable (or at all desirable), for example, for sports fans (and thus sports branding) since a tinted lens stops a user from being able to see a sports event adequately. Simply put, a lens of any type is 1) useless for branding as a lens cannot be effectively and usefully branded, and
2) substantially undesirable for a user in many branding genres, such as sports, where a lens is a hindrance to sight of a user.

One design that the present invention endorses is a 'shutter-type' design, which has multiple strut members within each orbital frame of the eyewear instead of lenses.

Removing the lens removes the aforementioned problems associated with the lens (lack of brandability and hindrance to sight of a user when worn, for example, when watching a sporting event). Replacing the lens with strut members opens up a possibility for the strut members to be coloured in colours and/or patterns associated with a brand.

However, there are significant problems with the shutter-type design for creating a fully brandable pair of merchandising eyewear.

Firstly, wings (also known as 'arms') of shutter-type glasses are too thin—shutter-type glasses come in one standard design that has become ubiquitous and there are few or no variations of the frame that substantially differ from this. Standard shutter glasses wings are extremely thin, and are of such a thinness that adding a stripe and/or pattern to the wing is aesthetically unfeasible. There simply isn't room to create an effective patterned or striped effect that accurately reflects a brand that has, for example, a famous stripe or pattern in their, for example, team strip. It is also significantly unfeasible to add a logo to the wing as there simply is not enough real estate to add a logo of significant size that adequately represents a brand, is recognisable, or is appropriate and pleasing for a brand; many blue chip brands do not allow their logo to be printed on branding materials in any smaller than a, for example, 20 mm height size. A logo of less size may be considered unprofessional, belittling, and counter-productive in terms of brand image. Furthermore, it may simply not be allowed by the brand due to inadequate logo size.

Furthermore, the orbital frame of shutter glasses is also extremely thin, which is part of the ubiquitous design. Again, this significantly limits brandability.

It would be desirable if a far wider wing was provided so that logo's, crests, etc that comply with requirements could be provided on the wing, and so that further branding elements, opening up new branding possibilities, could be provided longitudinally to the wing.

The thin wing and thin orbital frame of standard shutter-type glasses combines with a harsh 'aviator' style curvature for the orbital frame, resulting in glasses that are often described as 'party-style' glasses. Stylistically, these are incorrect for branding.

Branding for a shirt, or a hat is easy—these are neutral garments upon which correct colouration/patterns, logo's, printing, etc can be placed to convert the 'neutral garment' into the brand that is being branded upon it. However, standard shutter type glasses are stylistically 'party-style', 'fun', 'tacky'. Whilst this may be part of their appeal to a consumer, it is wholly inappropriate (and non-neutral) for branding.

Thus, not being neutral from a design perspective, standard shutter-type glasses do not provide a feasible base for correct branding—an iconic brand, for example, does not want to appear 'tacky'. Another brand, for example, does not want to appear 'fun', for example.

The present invention seeks to provide a solution to these problems, by providing a shutter eyewear apparatus, comprising an orbital frame, the orbital frame itself comprising a left orbital aspect and a right orbital aspect, multiple strut members within each orbital aspect, two oversized wings, the wings having a width of at least 12 mm at any point along the wings; a word element lengthwise along of at least one wing; and a franchise logo element.

Preferably the wings are 23 mm (or feasibly more) in width at a neck of the wing, gradually lessening in width as the wing extends towards the toe (end) of the wing.

Preferably the word element for branding is at least 7 mm in height. The word element for branding may be, but is not limited to being, a franchise name, team name, player name, event name, well-known word/phrase associated with a franchise/player, etc ('Longitudinal', for the sake of the present application, means 'lengthways' along the wing(s). The term 'longitude' of the wing(s) may similarly be taken to mean a 'length' of the wing(s)).

Preferably the franchise logo element is provided about the neck of a wing. Many franchises, iconic teams, etc will not allow a logo/crest of their franchise to be provided printed and/or applied unless it is of at least 20 mm, for example, in height. This is to protect against unprofessional and un-iconic use of such a logo/crest/shield/badge, which may fail to portray the brand/team/franchise in a professional and iconic manner. Thus a wide width of the wing may be essential in order to allow an icon/logo of such dimension to be provided.

There may be provided a franchise logo element as a central logo element on a bridge between the orbital aspects.

For branding of a franchise, team, event, nation etc that is associated with a singular colour, the eyewear may be singularly coloured, with branding elements (such as word element, franchise logo) for branding. For branding of a franchise, team, event, nation etc that is associated with multiple colours (such as a team that has a striped team strip, for example), the invention may be multiply coloured; for example, the strutted members may be multiply coloured to mimic and/or represent the team. Similarly, the wing may be multiply coloured—the width of the wing allows for a dual stripe, or tri-stripe configuration.

Preferably there are provided neutral curves for the orbital frame of the eyewear, which frame may also be significantly thickened. Intent is to provide a neutral and iconic base upon which branding can be provided.

In a preferred embodiment, both a word element is provided lengthways on a wing, and a franchise logo element is provided about a neck of the wing. Due to the nature of hinging of wings of eyewear, if the wings are hinged, there may be provided a forwardly angled folding break on the wing(s) to allow a greater sized logo to be provided about the neck.

Intent of the invention is to provide a neutral and iconic base and open up vast advertising and branding opportunities for teams, franchises, countries, events, and the like, generating revenue.

All parts of the eyewear can be used for branding; the strutted members not only eliminate the problem of a lens (which impairs vision for a user watching an event, etc, but also is substantially unbrandable). Neutralising of the curves of the orbital frame provide an appropriate base from which blue chip (or any branding) can benefit. Strut members do not significantly impair vision of a wearer, so a sporting event can be watched, or watched in part, by a wearer wearing the eyewear. The eyewear can also be used as a fashion accessory.

In other embodiments of the invention, there may be provided protruding strut members, thus mimicking a grill of an American football helmet.

Thus, according to a second aspect of the invention, there is provided an eyewear apparatus, comprising: an orbital frame, the orbital frame itself comprising a left orbital aspect and a right orbital aspect; a left wing and a right wing; and at least one forwardly protruding strut member in each orbital frame, forwardly protruding from a portion of each orbital aspect, thus mimicking a grill of a U.S. football helmet.

According to the second aspect of the invention, where the eyewear is configured to mimic a U.S. football helmet, the wings may be of any size/width. Preferably the wings are again significantly wide, most preferably approximately 23 mm or more in width at a neck of the wing, thus allowing for a significantly sized word element and franchise crest/logo to be provided, in line with a first aspect of the invention.

According to the third aspect of the invention, there is provided a method for creating fully brandable eyewear, comprising: having a shutter eyewear apparatus, the shutter eyewear apparatus comprising a left wing and right wing, an orbital frame with a left orbital aspect and right orbital aspect and bridge connecting the left and right orbital aspect, and strut members in the orbital aspects; providing the wings with a width of at least 12 mm at a widest point of the wings to provide appropriate space for branding; emblazoning at least one wing with a word element lengthwise along the wing; branding the eyewear with a franchise logo element; having the eyewear coloured in colouration associated with a franchise.

The present invention will now be more particularly described, with reference to the accompanying drawings, in no way limiting the scope of the invention, in which.

Figure 1:
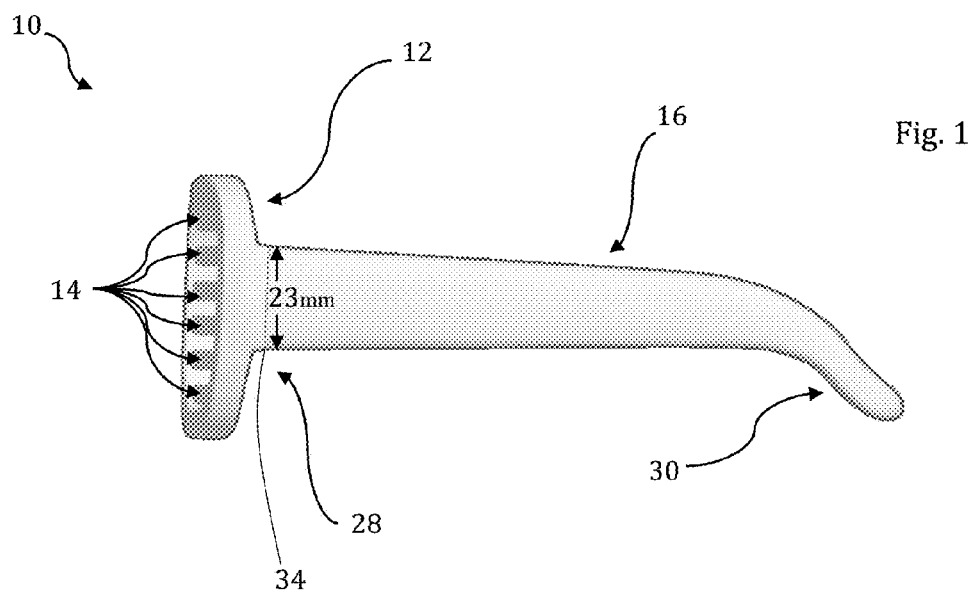
FIG. 1 is a side orthographic view of a brandable eyewear apparatus.

(Several of the drawings (for example, FIG. 1) show the eyewear apparatus without the word element and the franchise logo element in order to better show, and focus on, build characteristics of the eyewear).

DETAILED DESCRIPTION

Referring to the drawings, there is provided a shutter eyewear apparatus 10, comprising: an orbital frame 12, the orbital frame 12 itself comprising a left orbital aspect 12L and a right orbital aspect 12R; multiple strut members 14 within each orbital aspect; a left wing 16 and a right wing 16, the wings 16 having a width of at least 12 mm at any point along a length of the wings 16; a word element 48 along a length of at least one wing; and a franchise logo element 50.

The orbital frame 12 surrounds a user's eye's when worn, and comprises a right orbital aspect 12R and a left orbital aspect 12L which are substantially circular in shape and surround an eye of a user when worn as is usual for glasses eyewear. (Orbital aspects are referred to as 'left' and 'right' from a wearer's point of view. Therefore the right orbital aspect 12R is for wearing over and surrounding a user's right eye, and the left orbital aspect 12L is for wearing over and surrounding a user's left eye). There is provided a bridge 18 for bridging the right orbital aspect 12R and left orbital aspect 12L.

There is provided a nosecone 20 for holding the eyewear apparatus 10 on a nose of the user, although it is feasible other method(s) are used for holding the eyewear 10 about a face of a user. The nosecone 20 comprises a left part and a right part, which sits on a right side and left side of a nose of a user.

Figure 2:
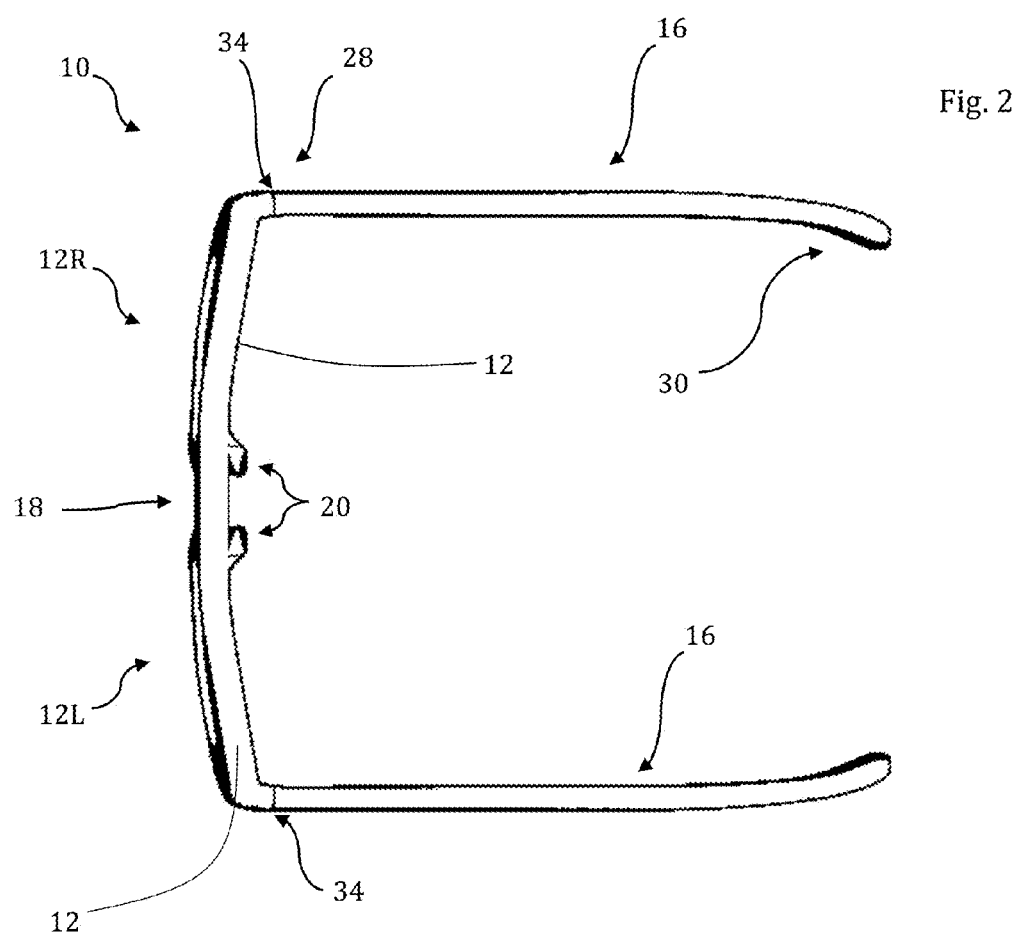
FIG. 2 is a top orthographic view of the brandable eyewear apparatus.
Figure 12:
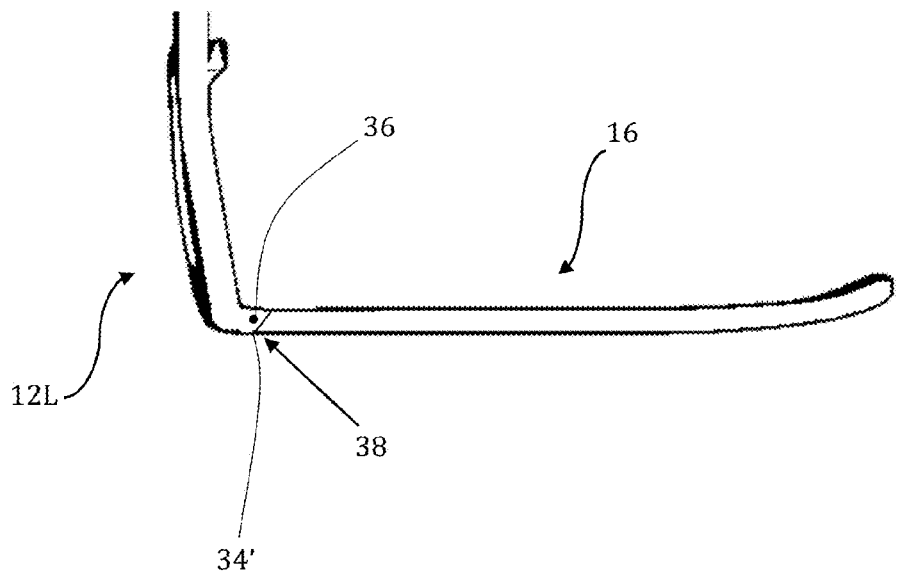
FIG. 12 shows a forwardly angled folding break.
Figure 18:
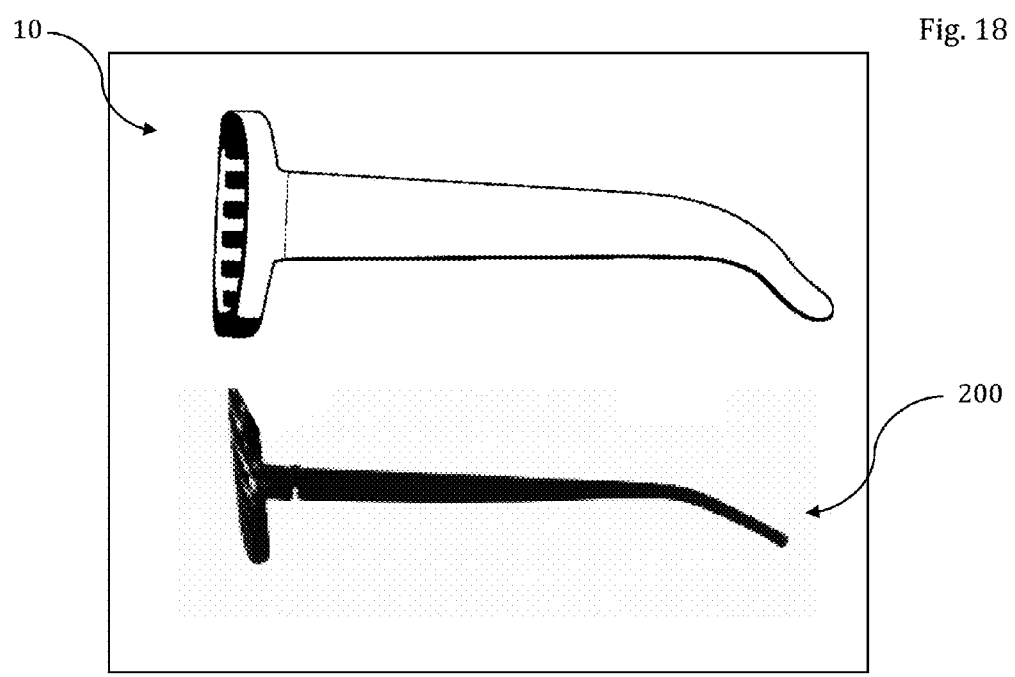
FIG. 18 is side comparison view of the invention with standard, ubiquitous shutter eyewear design, with particular reference to the wing(s).

As best shown on top view FIG. 2 and FIG. 12, the orbital frame 12 is unusually deep in thickness for a shutter eyewear apparatus. Preferably the orbital frame 12 is approximately 6 mm deep and may feasibly be deeper. This is a feature to enhance iconic-ness and visual design strength for the invention 10. Comparison in deepness of orbital frame 12 compared to standard shutter eyewear is shown in FIG. 18.

Figure 3:
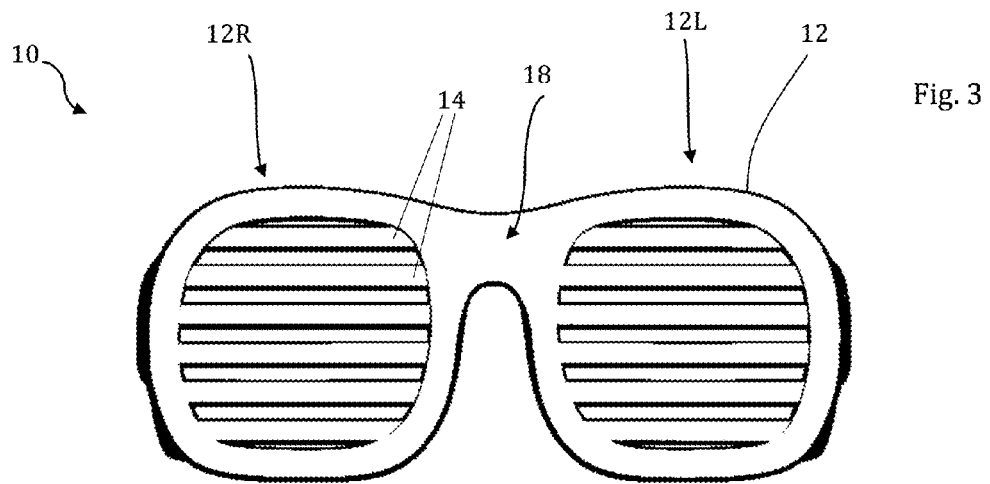
FIG. 3 is a front orthographic view of the brandable eyewear apparatus.
Figure 17:
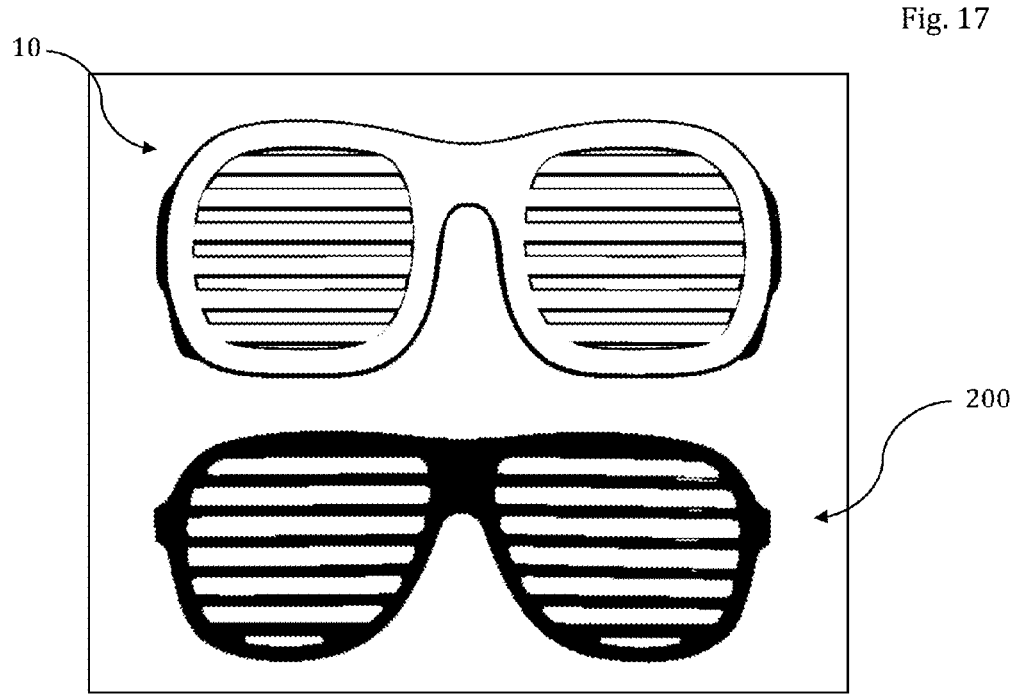
FIG. 17 is front comparison view of the invention with standard, ubiquitous shutter eyewear design, with particular reference to the orbital frame.

Similarly a front face of the orbital frame 12 (best seen FIG. 3 and FIG. 4 front views) is unusually thick for a shutter eyewear apparatus, and may be approximately 6 mm thick. Such features provide an iconic base for the eyewear 10. Comparison view with standard shutter eyewear apparatus can be seen in FIG. 17, showing a thickened orbital frame 12. As shown, the orbital frame 12 is preferably more rounded in shape than standard shutter eyewear in order to achieve a neutral base for branding. (Modifications may or will be required to shape of the orbital frame 12, in particular the nosecone 20 gap, which will be obvious to those with skill in the art; for example, nose cone 20 (lower gap between left orbital aspect 12L and right orbital aspect 12R) may require widening in order for the eyewear to sit comfortably on a user's nose and thus face).

Thus it can be seen that the orbital frame 12 is preferably both thicker in depth, and thicker in width, than a standard shutter eyewear apparatus.

There are provided a plurality of strut members 14 (also known as 'shutters') within the orbital aspects. Preferably there are provided five or six strut members 14 in each of the left orbital aspect 12L and right orbital aspect 12R, although there may be any number.

The strut members 14 have the aforementioned benefits for branding that they may be coloured, printed, etc to match a brand, franchise, team, event, etc. It will be known that shutters, despite seeming to greatly obscure vision of a user, in actuality allow for good frontal and peripheral vision for a user.

(Strut members 14 are not all labelled individually in the drawings in order to retain clarity of the drawings. Where required or useful, (such as in FIG. 11), strut members 14 are labelled 101, 102, 103, 104, 105, 106 is ascending order; a lowest strut member being labelled 101, and a highest strut member of example embodiments as shown in the drawings being labelled 106).

Figure 4:
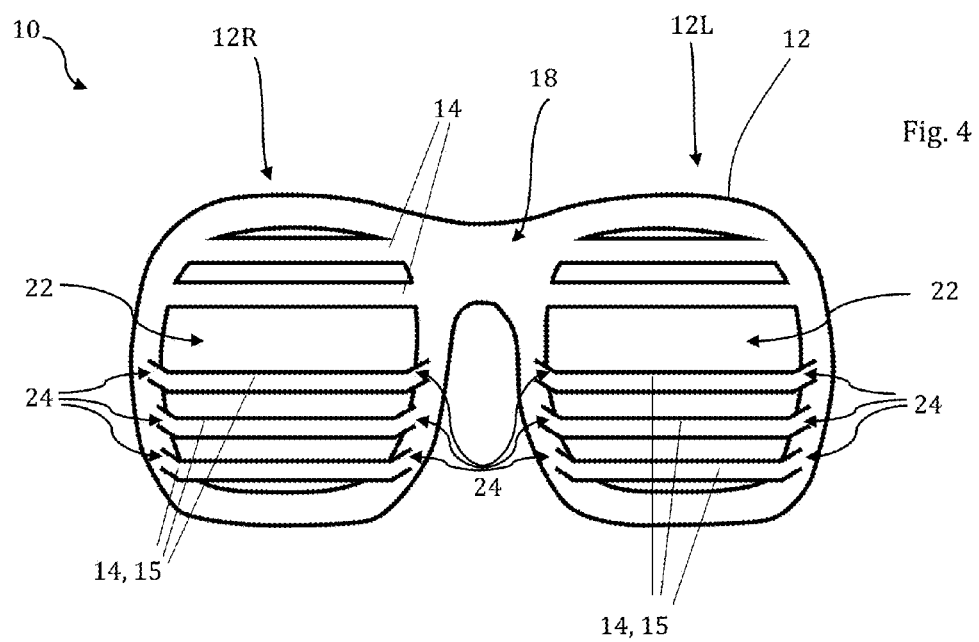
FIG. 4 is a front view of an eyewear apparatus where there are provided protruding strut members, thus mimicking a grill of an American football helmet.
Figure 5:
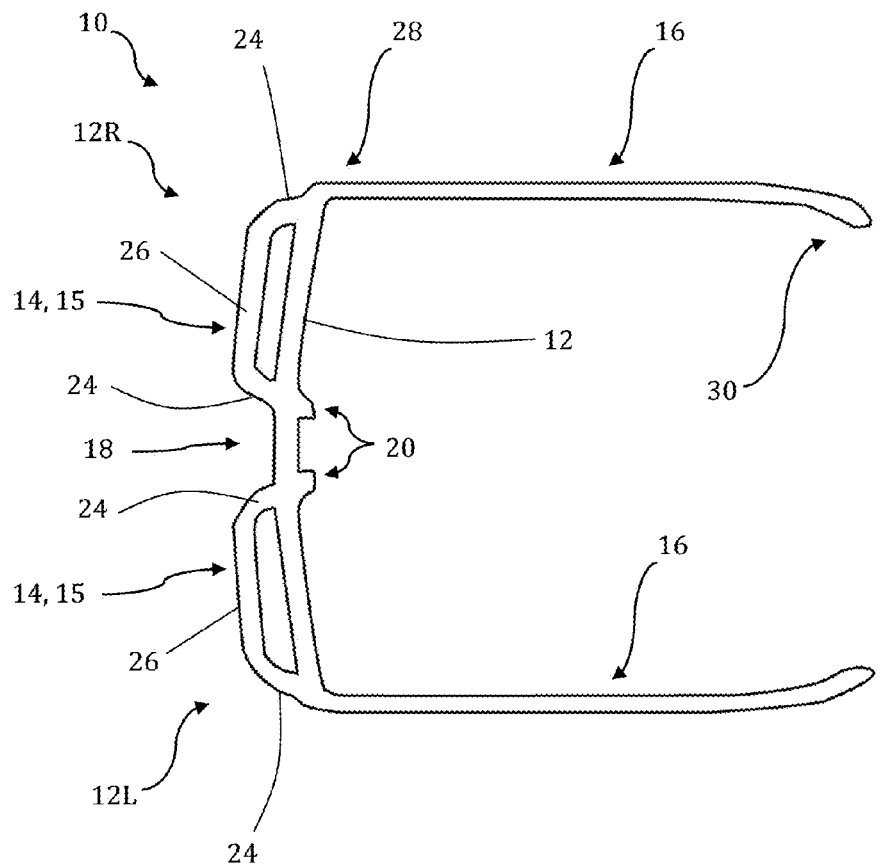
FIG. 5 is a top view of protruding strut members.

As shown in FIG. 4 and FIG. 5, in embodiments of the invention 10 configured for American football team(s) or other sports involving a grill, there may be provided protruding strut members 15 which protrude outward from each orbital aspect 12L, 12R. Intent is to mimic a grill of an American football helmet. This is preferably allied to correct colouration, branding, etc of the eyewear for the respective team (franchise), player, etc. Thus, for example, a franchise (American football team) may have helmets that tend to have unique colour configurations—for example a blue chip American football team may tend to have helmets worn by players that have a white grill, with blue helmet, and a distinctive logo on the helmet. The helmet may furthery have a, for example, red stripe running down its centre. Such colourations may become extremely distinctive to fans of the franchise.

Thus, it is feasible, in order to replicate the helmet of the franchise, and brand the eyewear 10 for fans, the protruding strut members 15 (and all strut members 14) may be provided as white, with the orbital frame being blue (to replicate the official blue colour of the franchise helmet) and there being a red stripe provided on the orbital frame 12 (which may be provided down the bridge 18 or any other part). Finally, the distinctive logo that is on the franchise helmet may be provided, for example, on the bridge 18, or, feasibly, on other parts of the eyewear 10, such as the wing 16. Thus highly evolved embodiments of the eyewear can be provided to replicate team/franchise strips, colourations, iconic branding, etc. Thus it can be seen the invention 10 can be used to mimic franchise colouring of a football helmet, with protruding strut members 15 to mimic a grill of the football helmet, and other distinctive colouring, striping, branding and logo'ing, etc. As will be shown, franchise name, player name, or even bespoked wording such as a name, etc may also be provided on a wing(s) 16 of the eyewear.

As shown in FIG. 4, there are preferably provided three protruding strut members for each orbital aspect, there thus being provided six protruding strut members 15 in total. However, there may be any number; for example, there may be provided two protruding strut members 15 per orbital aspect, or one, or more.

Preferably the protruding strut members 15 are lower strut members in each orbital aspect (as shown in FIG. 4), thus again mimicking a football helmet, where a protruding grill is low on the helmet.

In the preferred embodiment as shown in FIG. 4, there are also provided high strut members 14 above the protruding strut members 15, with there being provided an exaggerated gap 22 which may aid viewing for a wearer. Again, the exaggerated gap 22 is provided to mimic a football helmet, which has a significant gap in the visor to facilitate good vision for a wearer. An added benefit of the exaggerated gap between shutters is that it may aid vision of the wearer.

In such an embodiment, it is feasible there are provided no standard (non-protruding) strut members 14.

It is feasible there may also be provided with the protruding strut members 15 vertical (or substantially vertical) struts that mesh with the protruding strut members 15, creating a grill-type formation. Preferably such a formation, if used, is provided on a lower portion of the orbital aspects 12L, 12R.

The protruding strut(s) 15 preferably have two outwardly protruding lateral portions 24 and a substantially straight connecting portion 26. (Labelled in FIG. 5). The substantially straight connecting portion 26 may be curved. Preferably the two outwardly protruding lateral portions 24 and connecting portion 26 of each protruding strut member 15 are integrally formed as one piece, and may be a plastic. The protruding strut members 15 and orbital aspect 12 may be formed and manufactured as one piece, which will be obvious to those with skill in the art.

The protruding strut members 15 are not limited to requiring two outwardly protruding lateral portions 24 and a substantially straight central portion 26. Embodiments of the invention that feature protruding strut members for mimicking of a football helmet and the like may have wings less than 12 mm in thickness.

The wings 16 have a neck 28 and a curved toe 30, with the wing 16 preferably gradually lessening in wideness from the neck 28 to the toe 30.

According to a first aspect of the invention, the wings 16 have a width of at least 12 mm at any point along the wing. Width here is taken to mean (with reference, for example, to FIGS. 1, 6, 7, 8, 9, 10, 11, 13), a dimension of thickness from a bottom of the wing 16 to a top of the wing 16. Width is denoted in FIG. 1, where measurement of wing at folding break 34 is labelled as preferably being approximately 23 mm (and may feasibly be wider). Preferably a widest point of the wings 16 is at the neck 28, however, it is feasible the wing 16 may be widest at any point, the wing being at least 12 mm in width at any point along the wing 16. In other embodiments, the wing(s) 16 may be at least 15 mm or 20 mm in width at any point along the wing(s) 16. Preferably the wing 16 is approximately, or at least, 23 mm at a neck 28 portion of the wing, but may feasibly be greater in width; for example, the wing(s) 16 may be at least 25 mm in width at any point along the wing(s) 16, and may be greater than 25 mm.

Preferably there is provided a folding break 34 in the wings 16. It will be obvious that it is desirable for wings of an eyewear apparatus to fold, for safe and easy storage, as well as to avoid, or lessen a chance of, breakage. Thus the wings 16 are preferably foldable, there being provided a folding break 34 in the wings, after which point, the wings can be rotationally folded inwards toward the orbital frame 12.

Preferably the wing(s) are at least 12 mm, or 15 mm, or 20 mm, or 23 mm, and feasibly greater than 25 mm in width at the folding break 34. Definition of width at folding break 34 of the wing is an important factor in how large a franchise logo element 50 for branding can be if it is provided about the neck 28 of the apparatus 10. Therefore there may be employed a forwardly angled folding break 34' to facilitate providing of a larger franchise logo element for branding about a neck 28 of the wing(s) 16.

There are many means and methods of achieving folding of wings 16 of an eyewear apparatus, which will be obvious to those with skill in the art. One such method is a hinge joint. FIGS. 12 to 15 inclusive show forwardly angled folding breaks 34' where the folding break 34' is angled forwardly (rather than being a straight line). There is shown a hinge joint which has a screw 36 and the like, about which the wing(s) 16 are rotatably foldable inwards towards the orbital frame 12.

The wing 16 has an outward forward angled part 38 at the folding break (hence the term 'forwardly angled folding break' 34'). This may provide greater space for a franchise logo element for branding to be provided about a neck 28 of the wing 16, (as close to the orbital frame 12 as possible within appropriate limits). As will be seen, it is desirable for a franchise logo element for branding (if it is a crest, icon, etc often substantially circular or shield-shaped in dimension) to be provided about a neck 28 of the wing 16. It may be necessary to provide such a logo element after the folding break 34, 34' (as shown FIGS. 6, 7, 8, 9, 10, and 11), since applying a logo element for branding over the folding break 34, 34' may either be inappropriate from a manufacturing point of view, lead to a poor visual result, or may be inappropriate from a design point of view.

Therefore it may be desirable to use such a forwardly angled folding break 34' to gain extra real-estate (territory) for a franchise logo element 50 for branding to be placed as close to a neck 28 of the wing 16 as possible, and be provided in as large a size as possible. (If the neck 28 is the widest point of the wing 16, the closer a franchise logo element for branding is placed to the neck 28, the greater in size it may be, which may be desirable or necessary).

Figure 13:
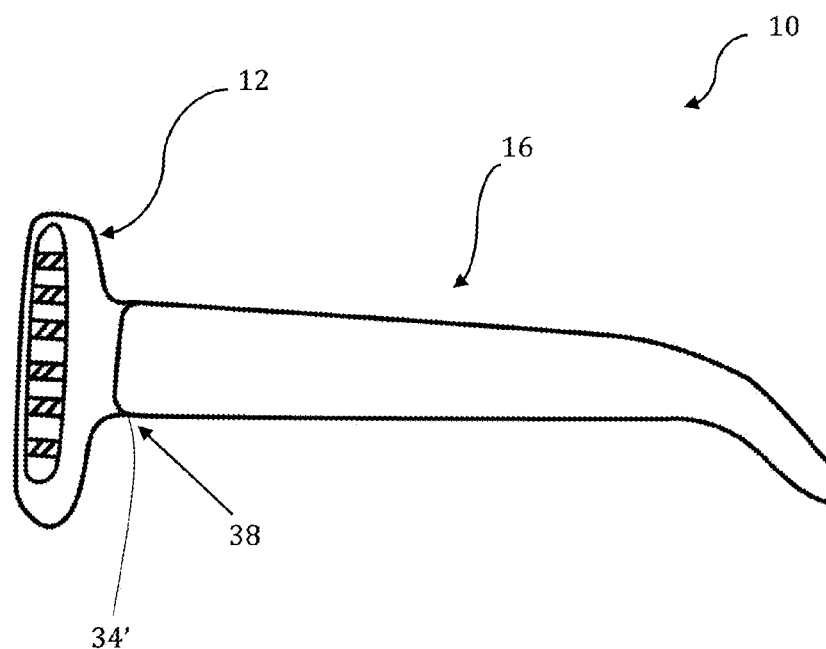
FIG. 13 is a side view of a curved forwardly angled folding break.
Figure 14:
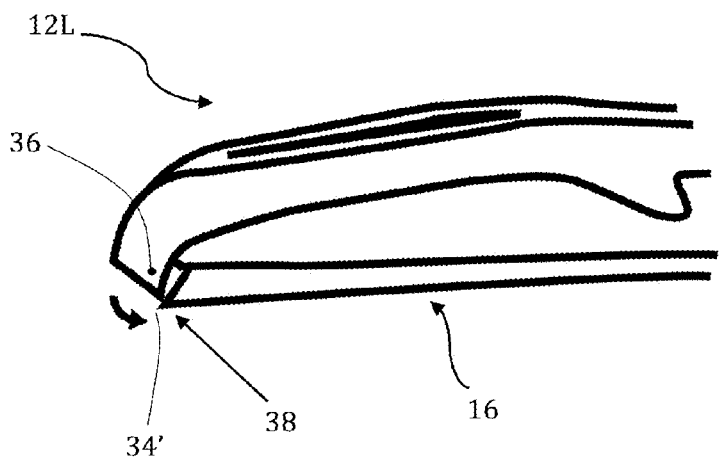
FIG. 14 is an embodiment of the eyewear apparatus showing a wing with a forwardly angled folding break when folded.
Figure 15:
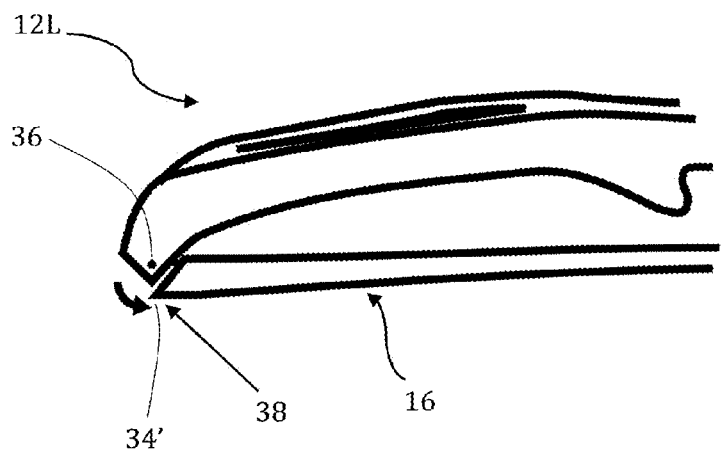
FIG. 15 is a second embodiment of the eyewear apparatus with a wing with a forwardly angled folding break when folded.

In FIGS. 12, 14, 15, outward forward angled part 38 is straightly angled. In FIG. 13, the outward forward angled part is curved. Thus added space may be provided for a franchise logo element (such as icon/emblem, etc) about a neck 28 of the wing 26 by a forwardly angled folding break 34'.

Figure 16:
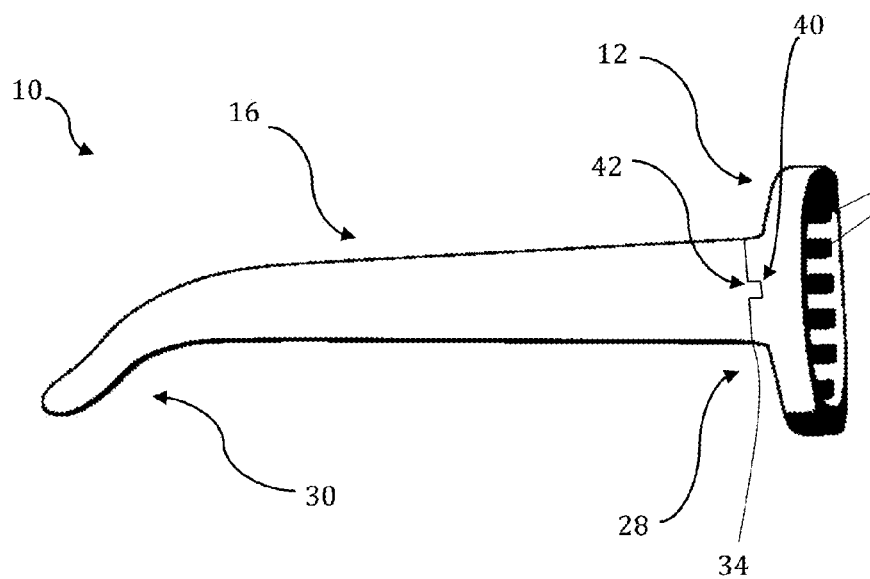
FIG. 16 is a side view of the eyewear apparatus wherein there is provided a flanged folding mechanism.

Referring to FIG. 16, there is shown an embodiment of a rotational folding mechanism for the wing 16 wherein there is provided a receiving recess 40, and a protruding attachment flange 42 for the wing 16 that is received by the receiving recess 40, the wing 16 preferably fixed for rotational folding via a screw 36 and the like. The screw may fit through an aperture in the neck 28 and through an aperture in the protruding attachment flange 42 as it is received by the receiving recess 40.

Similarly, vice versa, the receiving recess 40 may be provided on the wing 16, with the protruding attachment flange 42 being received by the receiving recess on the wing 16. There are many ways of providing foldability for wings of eyewear, which will be obvious to those with skill in the art, in no way limiting the scope of the present invention.

Significant and vast branding abilities are provided by the eyewear. In terms of the orbital frame 12 of the eyewear 10, the orbital frame 12 may be coloured (which may include colouring addition(s) and/or element(s) being applied) which are relevant to a particular brand, franchise, etc. If a franchise, for example, is equated with a particular one colour (such as, for example, red), the whole eyewear may be coloured red. This may be achieved by using pre-coloured materials (such as plastics, etc) for manufacture of the eyewear, and/or may be achieved via adding/applying of colouring agents, such as, for example, paint, dye, etc.

There may be provided a coloured rim 44 round an edge of the orbital frame 12 (shown in FIG. 7), which may enhance branding, particular for multiple-coloured branding.

Figure 9:
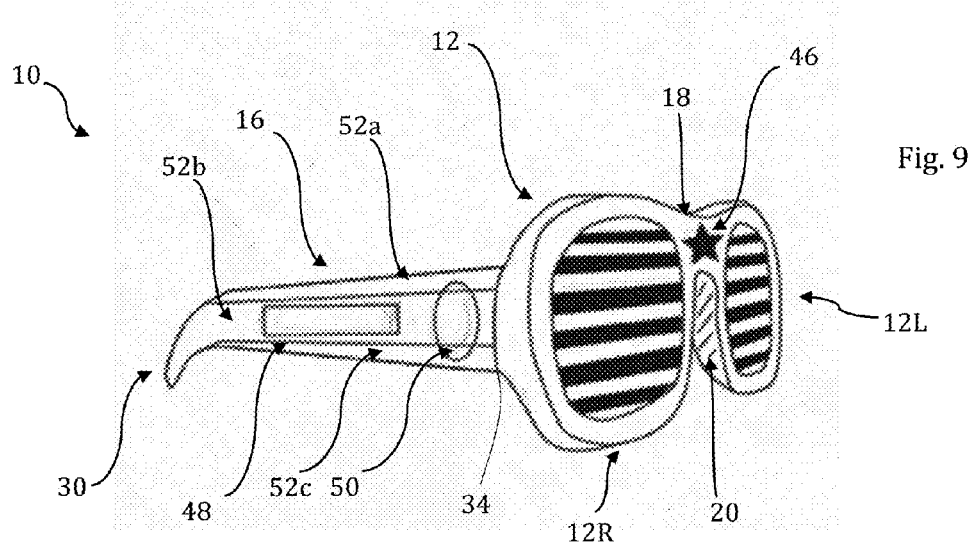
FIG. 9 is a perspective view of an advanced embodiment of the eyewear apparatus, wherein there is further provided a logo element on a bridge of an orbital frame.

An inner surface of the nosecone 20 may be coloured, having colouring agents applied (shown in FIG. 9). Thus significant branding through colouration can be achieved on the orbital frame.

There may also be applied a central logo element 46 for branding (shown FIG. 9) on the bridge 18 of the orbital frame 12. This may be a logo, icon, crest that is recognisable for a particular brand, franchise, team, company, event, etc.

Figure 8:
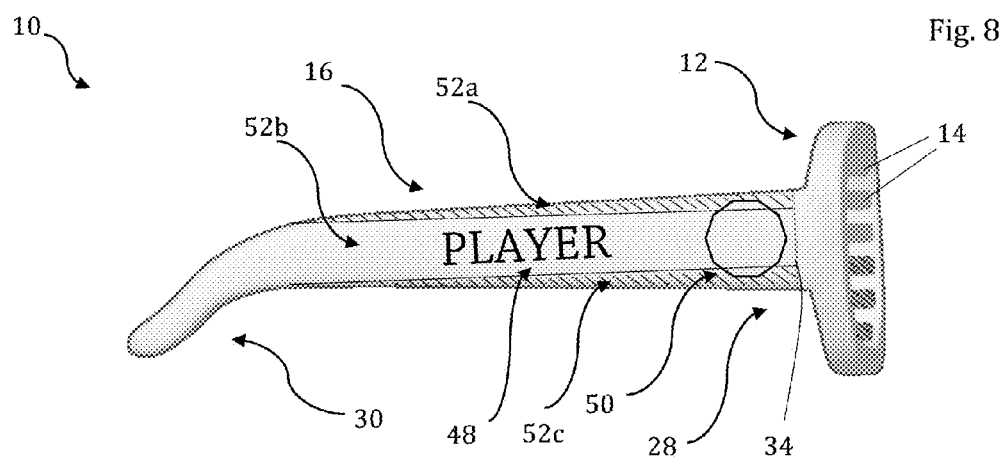
FIG. 8 is a side view of an advanced embodiment of the eyewear apparatus, wherein the wings of the eyewear are striped and the strut members are coloured to mimic colours of a franchise.

With reference to the strut members 14 (also known as shutters), the strut members 14 may be differently coloured if such colouration is fitting for a franchise, team, country, event, etc. If, for example, a franchise is associated particularly with two colours (for example a striped team kit), it is feasible the strut members 14 may be alternately coloured in the two associated colours of the franchise, thus enhancing branding. Similarly, as shown in FIG. 8, lower strut members 14 may be coloured in one of the two associated colours, with top strut members 14 being coloured in the other associated colour of the franchise (and the like). Thus strut members 14 have vast options for branding compared to standard, lens-based eyewear. (Although the present invention may, feasibly, have a lens as well as strut members 14).

Patterns, or a large image/crest for example, may be printed and/or applied to the strut members 14 as a whole, occupying most of the or each orbital aspect 12L, 12R. Thus the orbital aspect 12 and strut members 14 are significantly brandable.

With reference to the wing(s) 16, preferably there is provided a word element 48 for branding. Preferably this is a word element including letters, which word may be, for example, but not limited to, a franchise name, a franchise player, a country, an event name or place. The word element 48 may be provided in a font, or in such a way (such as a trademark word or phrase) that is familiar to fans of the brand, franchise, etc, thus enhancing recognisability and integrating with other branded items, such as clothing, etc.

Preferably the word branding element 48 is at least 7 mm in height (top-to-bottom of each letter, for example), and more preferably is approximately 10 mm is height, or more.

Preferably there is provided a franchise logo element 50 for branding about the neck of the wing(s) 16. This franchise logo element 50 is preferably a famous crest/emblem/logo and the like of the brand, franchise, event, etc for the invention 10 facilitates branding. If invention is used, for example, to facilitate branding of a United Kingdom football team, it will be obvious that all football clubs (not limited to the UK or any country) have a crest, emblem, club shield, badge, etc which is used for branding of the club (which club could also said to be a franchise). Thus such an emblem, crest, shield, badge, etc may be applied as the franchise logo element 50 for branding about the neck 28 of the wing(s) 16.

Similarly, many basketball teams, race car teams, brands, franchises, etc have a crest or logo associated with, and recognisable as part of, a brand. Such an icon/crest/logo, etc may be provided as the franchise logo element 50 about the neck 28.

It will be well known to those with skill and experience in blue chip company branding that many major (or any) brands, franchises, etc do not allow such emblems and the like to appear on branded items in any less than, for example, a size where the emblem, logo, crest etc is at least 20 mm in height. This is to maintain iconic and professional branding. Thus the present invention provides a solution to this problem as the wing(s) 16 are preferably at least 23 mm wide about the neck 28 or folding point 34, and may be wider. (It is feasible different brands may have different minimum logo size requirements).

Preferably the franchise logo element for branding 50 about the neck 28 is a main crest/shield/logo of the franchise, team, etc. If a central logo element 46 is also provided on a bridge 18 of the orbital frame 12, it is preferably a secondary logo, although it is feasible a main logo of the franchise, team, (ie the franchise logo element) etc may be provided on the bridge 18. A 'secondary' logo may be a portion of the main logo, or a separate logo element. Thus the franchise logo element 50 may be provided anywhere on the eyewear 10, and is most preferably provided at a neck 28 of a wing 16, (whether there is provided a secondary franchise logo or not). Thus both element 50 and element 46 may be said to be a franchise logo element.

It is feasible other elements for branding may be used as the franchise logo element 50 about the neck 28. For example, if the worded element 48 for branding is a player name, it is feasible that, for example, a number element associated with the player may be provided about the neck 28. It will be well-known to fans and experts that certain players in various sports who wear a particular shirt number become famous and synonymous with that number. Similarly, there are particular numbers for particular teams that are particularly important. An example is the number '10' shirt for many football teams, which is often worn by the most prolific striker in the team.

Thus, if the word element 48 is a name of a player famous and synonymous with a particular shirt number, such said number may be provided as the franchise logo element 50 for branding about the neck of the wing(s) 16. Any wing may be branded.

Furthermore, the word element 48 for branding may be bespokable; it is feasible a particular word, name, etc can be bespokely provided and applied to the wing 16. Thus, for example, it may be requested by a buyer to have their own name, or a name of a friend, family member, etc to be applied to the wing(s) 16 as the word element 48 for branding.

One, both, or no wings 16 may be branded.

An inside of each wing may also be used for branding, with element(s) such as logos provided. It is feasible branding element(s) of sponsors of the franchise, brand, event, etc 10 may be provided on the eyewear. Such agreements may involve endorsement deals, or may be included as endorsement deals for the main franchise for which the invention 10 is being branded. It is feasible the franchise may generate revenue by allowing sponsors, advertisers, etc to use real-estate on the invention 10 for branding and/or advertising, particularly on the wing(s).

Width of the wing(s) opens up further possibilities for mimicking of a franchise's team strip, well-known colours, etc, such as stripes, which are significantly unviable with standard shutter shade wings, which have a width of only approximately several millimetres.

The invention will now be described with reference to particular preferred embodiments shown in FIGS. 6 to 11 inclusive, by way of example only.

Figure 6:
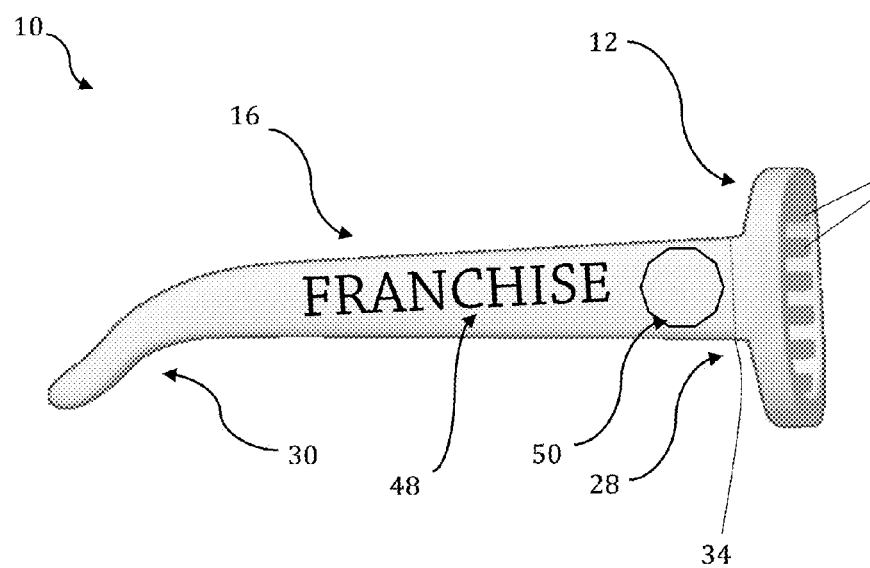
FIG. 6 is a side view of the brandable shutter eyewear apparatus where there is provided a word element for branding lengthways about at least one wing and a franchise logo element for branding about a neck of at least one wing.

There is shown in FIG. 6 a basic embodiment of the invention where the eyewear 10 is substantially of one uniform colour. For example (and taken by way of example only), the eyewear 10 may be used for branding of a sports team (ie franchise) associated with the colour red—a team who, for example, wear a red shirt. In such an embodiment, preferably a club emblem/logo shield is provided as the franchise logo element for branding 50 about the neck 28. Such a logo will tend to have multiple colours, feature the team/franchise's name, and may often have added iconography. Some of the icon, emblem, etc may be transparent.

Feasibly such an emblem/icon, etc may be provided by way of a sticker, which is one example of a franchise logo element for branding. Any of the elements for branding of the eyewear 10 may be provided by way of stickers. However, preferably the element(s) are printed, being applied as a print (which are often printed from a stamp and the like which is itself often designed from a digital printed logo).

It is feasible the element(s) for branding are digitally applied, created, etc. It is feasible other technologies such as laser are used to apply element(s) for branding to the eyewear, at any point during manufacture. Any method may be used to apply element(s) for branding.

In the example embodiment of FIG. 6, the word element 48 for branding is the franchise name—for example, the team who are associated with the colour red. The word element 48 may appear in a font and/or lettering that is recognised and/or part of trademarks associated with the club. It may appear in a font used on team strips, for example.

For an iconic brand, the three aspects of the red (for this example) colouration, the franchise name for the word element 48, and the team's iconic emblem/club shield, etc as the franchise logo element for branding about the neck 28 creates a hitherto unseen invention which satisfies all criteria for viable branding in an eyewear apparatus. The item is instantly recognisable to fans and provides a strong neutral base for branding.

It will be obvious that such products may be highly prized by fans of the franchise.

Figure 7:
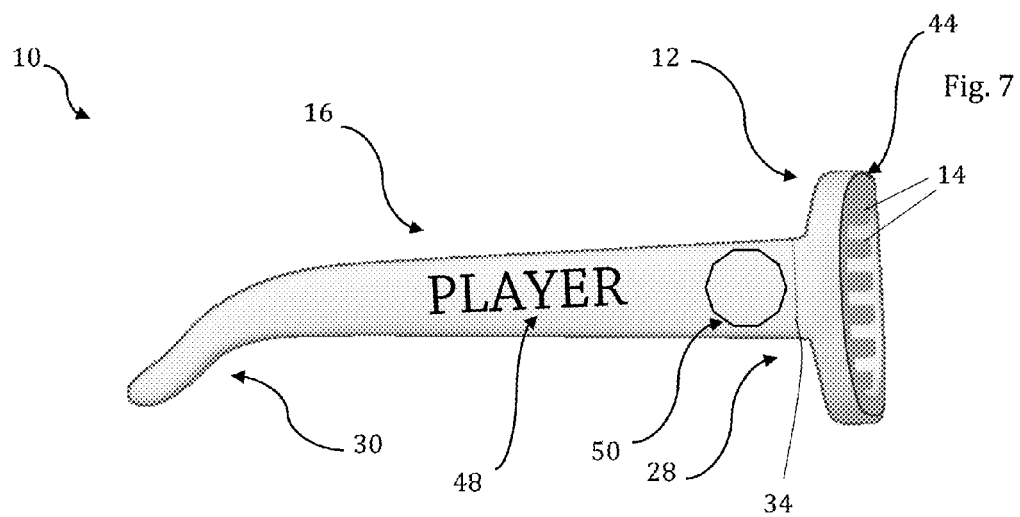
FIG. 7 is a side view of a similar embodiment to FIG. 6, wherein the word element for branding is specific to a player name of a franchise.

In FIG. 7, in a similar embodiment to FIG. 6, rather than simply a franchise/team name, a name of a player of the franchise is used as the word element 48. It will be obvious that particular players within franchises (such as sports teams) have large fan-bases and support. Thus the invention 10 can be optimised for branding the team itself, and a player of the team. The franchise logo element 50 about the neck and colour of the eyewear 10 may, for the present example, remain the same (an emblem/crest of the franchise). Now a player of the team is named as the word element 48.

Preferably the name is provided in a same font (or substantially the same) as seen on a team shirt of the player when playing for the team. This enhances branding by, to some extent, mimicking branding of a player's team strip for the eyewear 10.

In FIG. 8 there is shown a more advanced embodiment of the invention as seen in FIG. 7, wherein the team/franchise, etc has a two-coloured strip, or associated colours. It will be obvious that many teams have a two-coloured team strip. In the example embodiment as shown in FIG. 8, the eyewear apparatus 10 is embellished with two colours, which may, for example, be white and red. There is shown a first stripe 52*a* at a top portion of the wing(s) 16; there is shown a second (middle) stripe 52*b* in a middle portion of the wing(s) 16; and there is shown a third stripe 52*c* at a bottom portion of the wing(s) 16.

Such a tri-stripe configuration is made viable by the extreme width of the wing(s) 16. For the present example, striped portions (52*a*, 52*c*) of the eyewear represent a red colouration; non-striped portions (for example 52*b*) represent a white colouration. Thus top stripe 52a and bottom stripe 52c are red; middle stripe 52b is white. As shown, preferably the word element 48 for branding is applied within the confines of the middle stripe 52b. It is feasible it may encroach into stripe 52a and/or 52c.

There is again provided a franchise logo element about the neck 28, and lower strut members are provided in red, whilst higher strut members are provided in white. Thus it can be seen that the invention can be significantly configured and optimised for two-colour franchise branding. There may also be provided a coloured rim 44, as shown in FIG. 7.

A similar advanced embodiment is shown in FIG. 9, wherein there is also provided an central logo element 46 for branding on the bridge 18 of the eyewear 10. This may be a logo, a club crest, emblem, etc. An inner surface of the nosecone 20 has been coloured.

Figure 10:
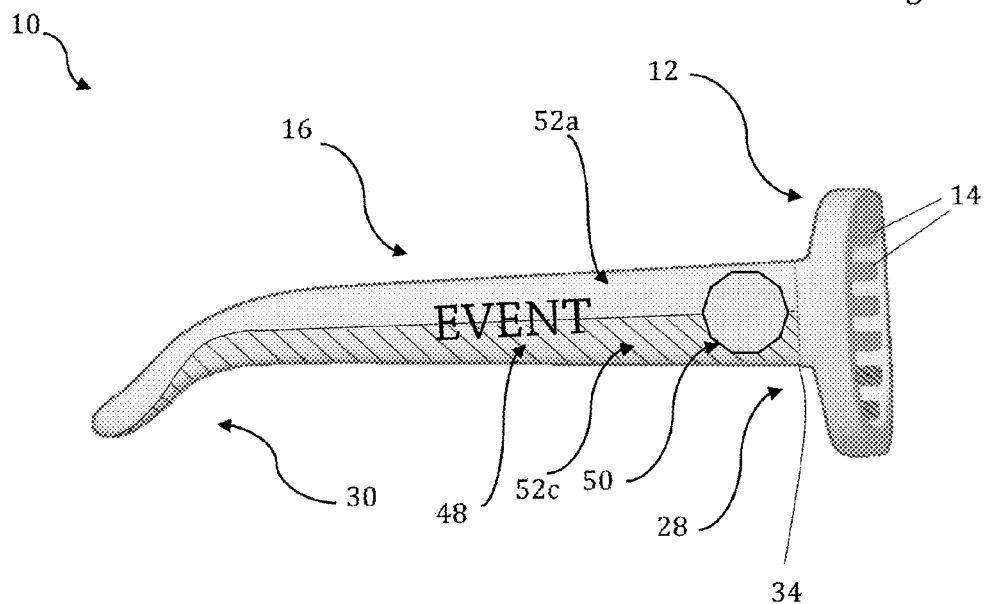
FIG. 10 is a side view of the shutter eyewear apparatus wherein the apparatus is branded for a major event.

There is shown in FIG. 10 an embodiment of the invention where the eyewear 10 is configured for branding of an event. It will be obvious that there are iconic worldwide events, such as sporting events that generate marketing revenue. Such examples may include, for example, the Olympics. Such worldwide events tend to have logo's associated with them, and may even have particular font(s) associated with them, (which may have been created solely for the purpose of branding for the event). Thus the word element 48 for branding may be the event name, or may be a place where the event is being held, which elements may be provided in a particular font associated with the event, logo, etc.

Logo of the event is preferably provided as the franchise logo element 50 about the neck 28. In the embodiment shown in FIG. 10, the eyewear is branded in a two colour configuration. There is provided a dual stripe configuration for the wing(s) 16, there being provided a top stripe 52a, and a bottom stripe 52c. Two lower struts of the strut members 14 are coloured similarly to the bottom stripe 52c of the wing 16, with four upper struts being coloured similarly to the top stripe 52a of the wing 16. Such an item may be sold at arena, etc during a major sporting (or other) event, and could feasibly be used for charitable events.

The invention is not limited to the examples given; other franchises may use the invention as a platform for branding (and therefore selling). For example, movies may have limited edition releases of the eyewear 10; Superhero franchises may use the eyewear 10, where, for example, the eyewear 10 may be coloured in an iconic and recognisable colour of a superhero, the main symbol/logo/emblem of the superhero being provided by way of the franchise logo element 50 about the neck 28, and the name of the superhero being provided by way of the word element 48 for branding on the wing(s). Digitalised elements may be provided about the eyewear 10 in any embodiment. Revenue may be generated by allowing sponsors to use the eyewear for branding and/or advertising in any embodiment. For example, a superhero franchise that uses the invention 10 for branding may allow a food or drinks company, for example, to have a logo applied and/or provided on the eyewear 10.

No shutter eyewear apparatus has provided facility for such intuitive and holistic branding.

Figure 11:
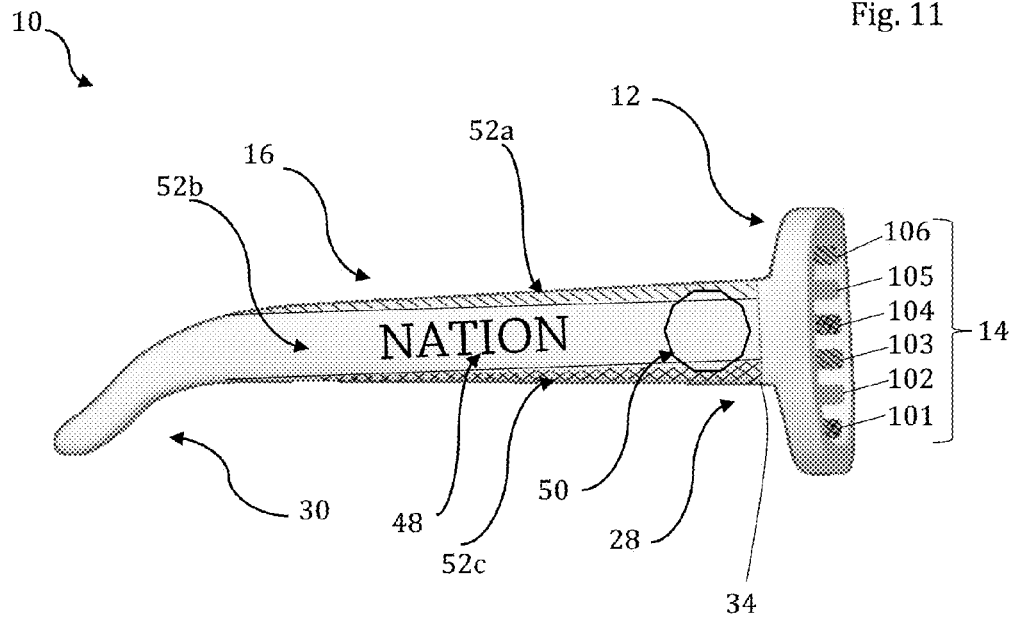
FIG. 11 is a side view of the eyewear apparatus wherein the apparatus is branded for a nation.

There is provided in FIG. 11 an embodiment of the invention configured for branding of a nation. Some nations, for example the United States, are associated with and/or have flags with, three colours—for example red, white and blue. In the example embodiment, there is thus provided a tri-stripe configuration for the eyewear 10. The top stripe 52a is red (represented by diagonal shading), the middle stripe 52b is white (represented by no shading), and the bottom stripe 52c is blue (represented by cross-shading). As can be seen, the strut members 14 are also tri-coloured; a first strut member 101 being blue; a second strut member 102 being white; a third strut member 103 being red; a fourth strut member 104 being blue; a fifth strut member 105 being white; and a sixth strut member 106 being red.

The franchise logo element 50 about the neck may be a national flag, or emblem and the like. It is feasible no franchise logo element 50 is provided.

The word element 48 may be a nation, such as 'United States', 'USA', etc. It is feasible that there is provided a word element 48 on both wings 16; for example, one wing may have 'United' applied as the longitudinal element 48, with the other wing having 'States' applied.

It is feasible that word(s) associated and recognisable with the nation, franchise, etc may be provided for the word element(s) 48. Thus, for the present example, one wing may read 'God Bless' with the other wing 16 reading 'America'. Stars and other associated elements may be provided about the wing(s) 16 and/or orbital frame.

All such embodiment examples may be used in combination; for example, at a famous event, such as a world cup of football, the invention may be coloured and branded for a particular nation. A famous player name associated with that nation may be applied as the word element 48. A logo of the world cup itself (which is a franchise logo element) may be applied, for example, as the central logo element 46, or as a franchise logo element 48 about a neck 28 of the eyewear 10. Furthermore, sponsors may be allowed to use the invention for branding. Inner surfaces of the wing(s) may be used for such, or any, branding, and for application of branding element(s).

In embodiments where there are provided protruding strut members, the orbital frame mimicking, or substantially mimicking, a US football helmet, the wing(s) of the eyewear may mimic other aspects of a team strip, such as trousers worn by the football team. For example, if the team strip includes yellow trousers with a black and white stripe, so the wing(s) may be yellow, with a black and white stripe. Such embodiments preferably include word element(s) and franchise logo element(s) to the wing, and may include a franchise logo element as the central logo element on the bridge of the orbital frame.

The present invention facilitates branding that has not been achievable with any previous eyewear apparatus.

One intent of the invention is to complete the marketing arsenal of any blue chip (or smaller) team, franchise, event, company, etc.

The embodiments described above are provided by way of example only, and various modifications will be apparent to persons skilled in the art, without departing from the scope of the invention as set out in the appended claims.

The invention claimed is:

1. An eyewear apparatus, comprising:
  a left wing and a right wing; and
  a left eye frame portion and a right eye frame portion;
  wherein for each eye frame portion there is provided at least one forwardly protruding low strut member, a portion or a whole of the strut member being provided in a lower half of the eye frame portion, the protruding strut member comprising:
    a left forwardly protruding lateral portion;
    a right forwardly protruding lateral portion; and
    a central portion running between the forwardly protruding lateral portions;
  wherein the protruding strut members are provided separately in each eye frame portion, there being provided a nose cone area gap between the lower half of the left eye frame portion and the lower half of the right eye frame portion, the nose cone area gap thus separating the at least one forwardly protruding low strut member of the left eye frame portion, and the at least one forwardly protruding low strut member of the right eye frame portion.

2. An eyewear apparatus as claimed in claim 1, wherein, for at least one said forwardly protruding low strut member that protrudes from the left eye frame portion, and for at least one said forwardly protruding low strut member that protrudes from the right eye frame portion, the left forwardly protruding lateral portion of the protruding strut member protrudes from a left side of the eye frame portion from which the protruding strut member protrudes, the right forwardly protruding lateral portion of the protruding strut member protrudes from a right side of the eye frame portion from which the protruding strut member protrudes, and the central portion runs in front of the eye frame portion from which the protruding strut member protrudes.

3. An eyewear apparatus as claimed in claim 1, wherein at least one said forwardly protruding low strut member of each frame portion protrudes to such an extent that, from a top view, there is a gap between a central portion of the protruding strut member and any portion of the eye frame portion from which it protrudes.

4. An eyewear apparatus as claimed in claim 1, wherein the central portion of any of the forwardly protruding strut members is substantially straight, running substantially parallel with the eye frame portion from which it protrudes.

5. An eyewear apparatus as claimed in claim 1, wherein the central portion of any of the forwardly protruding strut members is curved.

6. An eyewear apparatus as claimed in claim 1, wherein there is further provided at least one higher strut member for each eye frame portion, provided high on the eye frame portion.

7. An eyewear apparatus as claimed in claim 6, wherein there is provided an exaggerated gap between the at least one higher strut member and the at least one low protruding strut member of each eye frame portion.

8. An eyewear apparatus as claimed in claim 7, wherein at least one higher strut member is a non-protruding strut member.

9. An eyewear apparatus as claimed in claim 1 wherein there are provided a plurality of the low protruding strut members for each eye frame portion.

10. An eyewear apparatus as claimed in claim 9, wherein there is provided at least one higher strut member for each eye frame portion, and an exaggerated gap between the plurality of low protruding strut members and the at least one higher strut member.

11. An eyewear apparatus as claimed in claim 1, wherein there are provided vertical, or substantially vertical, struts that mesh with the at least one protruding strut member of each eye frame portion, creating a grill-type formation.

12. An eyewear apparatus as claimed in claim 1, wherein the eyewear apparatus is coloured and branded to represent an American football team.

13. An eyewear apparatus as claimed in claim 12, wherein the eye frame portions are coloured to mimic colouration of an American football helmet of a team strip of the American football team.

14. An eyewear apparatus as claimed in claim 12, wherein the wings are coloured to mimic colouration of trousers of a team strip of the American football team.

15. An eyewear apparatus as claimed in claim 12, wherein there is provided a word element lengthways along at least one of the wings, the word being a word relevant to or associated with the American football team.

16. An eyewear apparatus as claimed in claim 15, wherein the word is at least one of:
a team name;
a player name.

17. An eyewear apparatus as claimed in claim 1, wherein the left and right eye frame portions are substantially circular in shape and surround left eye and right eye of a user, respectively, when worn.

18. An eyewear apparatus as claimed in claim 1, wherein at least one said forwardly protruding low strut member for each eye frame portion terminates at each side of the eye frame portion, wherein a whole of the lateral portions and central portion of the forwardly protruding low strut member is provided below a level of a zenith of the nose cone area gap.

19. An eyewear apparatus, comprising:
a left wing and a right wing; and
a left eye frame portion and a right eye frame portion;
wherein the eyewear further comprises:
at least one forwardly protruding low strut member, a portion or a whole of the strut member being provided in a lower half of the left eye frame portion, the strut member protruding forwardly from the left eye frame portion to such an extent that, from a top view, there is a gap between any portion of the protruding strut member and any portion of the left eye frame portion; and
at least one forwardly protruding low strut member, a portion or a whole of the strut member being provided in a lower half of the right eye frame portion, the strut member protruding forwardly from the right eye frame portion to such an extent that, from the top view, there is a gap between any portion of the protruding strut member and any portion of the right eye frame portion;
wherein the protruding strut members are provided separately in each eye frame portion, there being provided a nose cone area gap between the lower half of the left eye frame portion and the lower half of the right eye frame portion, the nose cone area gap thus separating the at least one forwardly protruding low strut member of the left eye frame portion, and the at least one forwardly protruding low strut member of the right eye frame portion.

20. An eyewear apparatus, comprising:
a left wing and a right wing; and
a left eye frame portion and a right eye frame portion;
wherein for each eye frame portion there is provided a forwardly protruding low strut member, a portion or a whole of the strut member being provided in a lower half of the eye frame portion, the protruding strut member comprising:
a left forwardly protruding lateral portion protruding forwardly at a forward angle;
a right forwardly protruding lateral portion protruding forwardly at a forward angle; and
a central portion running between the forwardly protruding lateral portions and in front of the eye frame portion from which it protrudes;
wherein the forwardly protruding lateral portions protrude forwardly to such an extent that, from a top view, there is a gap between the central portion of the forwardly protruding low strut member and a portion of the eye frame portion from which the forwardly protruding low strut member protrudes;

wherein the forwardly protruding low strut members are provided separately in each eye frame portion, there being provided a nose cone area gap between the lower half of the left eye frame portion and the lower half of the right eye frame portion, the nose cone area gap thus separating the forwardly protruding low strut member of the left eye frame portion, and the forwardly protruding low strut member of the right eye frame portion.

* * * * *